United States Patent [19]

Self et al.

[11] Patent Number: 5,710,360
[45] Date of Patent: Jan. 20, 1998

[54] THERMAL DESORPTION SYSTEM FOR DECONTAMINATING MATERIALS

[75] Inventors: John R. Self, Vinemont, Ala.; Robert A. Olexy, Littleton, Colo.

[73] Assignee: Vanish, Inc., Ponte Vedra Beach, Fla.

[21] Appl. No.: 728,429

[22] Filed: Oct. 9, 1996

Related U.S. Application Data

[63] Continuation of Ser. No. 414,336, Mar. 31, 1995, abandoned.

[51] Int. Cl.$^6$ ............................................ A62D 3/00
[52] U.S. Cl. ........................ 588/213; 588/209; 588/228; 588/900; 204/157.15; 204/158.2; 204/158.21; 110/346; 422/199
[58] Field of Search .................... 588/209, 213, 588/228, 900; 204/157.15, 158.2, 158.21; 110/346; 422/199

[56] References Cited

U.S. PATENT DOCUMENTS

| | | | |
|---|---|---|---|
| 3,616,768 | 11/1971 | Southwick | 110/8 E |
| 4,606,283 | 8/1986 | DesOrmeaus et al. | 110/250 |
| 4,667,609 | 5/1987 | Hardison et al. | 110/236 |
| 4,782,625 | 11/1988 | Gerken et al. | 47/1.42 |
| 4,816,228 | 3/1989 | Yoshida et al. | 422/159 |
| 4,855,083 | 8/1989 | Kagawa et al. | 252/632 |
| 4,873,789 | 10/1989 | Plattner | 42/1.42 |
| 4,934,286 | 6/1990 | Fowler | 110/346 |
| 5,000,101 | 3/1991 | Wagner | 110/346 |
| 5,184,950 | 2/1993 | Fraysse et al. | 432/13 |
| 5,362,468 | 11/1994 | Coulon et al. | 423/445 R |
| 5,424,042 | 6/1995 | Mason et al. | 422/159 |
| 5,536,114 | 7/1996 | Wetmore et al. | 405/128 |
| 5,603,684 | 2/1997 | Wetmore et al. | 588/252 |

*Primary Examiner*—Cecilia J. Tsang
*Assistant Examiner*—C. Delacroix-Muirheid
*Attorney, Agent, or Firm*—Jones, Tullar & Cooper P.C.

[57] ABSTRACT

A thermal desorption system for treating and/or removing contaminants from various types of materials employs an induction tube furnace to heat the material to a high enough temperature to completely desorb it. The induction tube furnace includes a metal or metal alloy susceptor tube for containing the material to be treated and at least one induction coil surrounding the tube for heating the same. The susceptor tube is formed from a metal or metal alloy, such as a nickel based alloy, having a very high melting temperature which will allow it to be heated by the induction coil to temperatures as high as 1800° F. The metal or metal alloy also has a relatively high electrical resistance to permit efficient magnetic coupling of energy from the induction coil to the tube, as well as a relatively high thermal conductivity to provide efficient heat transfer from the tube to the material to be treated. Depending upon the nature of the material to be treated, an auger type conveyor can be employed to move the material through the susceptor tube at a controlled rate of speed, which in turn controls the residence time of the material in the tube, and therefore the temperature to which it is heated. An inert atmosphere is maintained within the tube to prevent combustion of the material, and the vaporized contaminants exiting the susceptor tube are condensed for recovery and recycling, while the desorbed material in the form of char is removed for disposal in a conventional manner.

20 Claims, 4 Drawing Sheets

THERMAL DESORPTION SYSTEM FOR DECONTAMINATING MATERIALS

This application is a continuation of application Ser. No. 08/414,336, filed Mar. 31, 1995, now abandoned.

BACKGROUND OF THE INVENTION

The present invention relates in general to a thermal desorption system for decontaminanting various types of materials.

In recent years, the Environmental Protection Agency (EPA) and the Department of Transportation (DOT) have continued to enact more and more restrictive regulations concerning the transportation, handling, processing and disposal of waste while mandating increased waste minimization. A significant feature of waste minimization is the processing of waste in such a fashion as to recover certain components (hydrocarbons, metals, silica, etc.) so that these materials may be recycled for reuse.

The obvious economic impact of increased environmental regulations has been increased handling, processing and disposal costs on the part of generators. Despite the need, economically feasible technology has not surfaced capable of handling the wide variety of waste materials that are candidates for waste minimization through technologies focussed on decontamination and volume reduction/recovery. By way of example, it is a common occurrence for soil to become contaminated by petroleum and other hydrocarbons. The traditional disposal regimen includes either landfilling the contaminated waste or incinerating the material which is cost prohibitive. Increasingly more restrictive regulations aimed at reducing environmental risks by limiting contaminant concentrations in waste destined for landfilling (specifically in the above example, hydrocarbons) have forced generators to comply with what EPA refers to as Best Demonstrated Available Technology (BDAT) standards based on analyte of the Uniform Treatment Standards (UTS).

Wastes recognized as hazardous by EPA are not the only materials of concern that impact the environment. Medical related wastes, sometimes referred to as "red bag wastes", contain pathogens and other potentially harmful contaminants that must now be pretreated prior to landfilling the residues.

With the ever-decreasing concentration levels allowed for hydrocarbons and other contaminants in landfills, generators must now process or decontaminate waste or send the materials to incinerators. Compounding the problem of enhanced costs of disposal by way of incineration is diminishing public and regulatory acceptance of incinerators primarily due to the content and volume of gases discharged by incinerators. Further, incineration inherently involves the use of open flames which are too hazardous for certain environments, such as petroleum refineries for example.

Changing regulations inspired by public concerns aimed at safeguarding the environment, therefore, have become the catalyst for the development of advanced technologies designed to decrease and minimize waste volumes by separating waste by component and recovering reusable components. These technologies must at the same time reduce fugitive discharges below regulatory tolerance levels while maintaining an effective monitoring network.

In an effort to address these concerns, a number of toxic or hazardous waste treatment techniques have been developed in which the material is heated without use of combustion or open flames. In particular, these techniques employ electrical resistance or induction heating. An example of the former may be found in U.S. Pat. No. 5,184,950 to Fraysse et al. which discloses a process and device for decontamination of solid material that employs resistance heating elements to heat a treatment enclosure close to 500° C. During treatment, a vacuum is maintained within the enclosure, and an inert heating gas may be pumped into the enclosure, depending upon the type of material to be treated. Unfortunately, electrical resistance heating is very inefficient and costly, and cannot heat materials to a high enough temperature to separate all types of contaminants from the materials.

Induction heating provides a more efficient alternative to resistance heating, however, until now, no one has devised an efficient induction heating technique that can be employed for separating contaminants from all types of materials, including those with very high moisture contents. For example, U.S. Pat. No. 5,000,101 to Wagner discloses a hazardous waste reclamation process in which waste, such as PCB contaminated material, is pyrolized in a closed system in a molten alloy containing aluminum. An induction heater heats a reactor containing the material to be treated to approximately 800° C. Unfortunately, this arrangement is not suitable for use with contaminated materials in a liquid slurry form because contacting the molten metal with moisture from the slurry would create a dangerous condition in which there is a risk of violent reactions, and even explosion. Further, the type of device disclosed in Wagner is very inefficient due to the low electrical resistance of aluminum which prevents it from coupling efficiently to the magnetic field generated by the induction heating coil. As a result, the Wagner device could not be employed for processing large amounts of waste material quickly because the amount of energy necessary to keep the molten aluminum continually heated to a high enough temperature would be cost prohibitive.

In view of the foregoing, it is apparent that a strong need still exists for an improved technique for heat treating contaminated materials to remove the contaminants therefrom which is suitable for treating all types of materials, and removing all types of contaminants in a cost efficient manner.

SUMMARY OF THE INVENTION

The present invention fulfills the foregoing need through provision of a system for thermally desorbing contaminated materials in which induction heating is employed in a very efficient manner to heat the materials to a very high temperature and desorb the materials by vaporizing all liquids contained therein. To achieve this, the materials are placed in, or conveyed through, a susceptor tube that is formed from a metal or metal alloy having a very high melting temperature (e.g., on the order of approximately 2300° F. or higher). One or more induction coils surrounding the susceptor tube are employed to heat the tube to a very high temperature (preferably approximately 1800° F. (1000° C.)), which is nevertheless substantially below the melting temperature of the susceptor tube. With this arrangement, the susceptor tube remains solid during the material treatment so that the material never comes in contact with molten metal. As a result, this arrangement is particularly suited for treating high moisture content materials, such as hydrocarbon contaminated soil, for example.

The material forming the susceptor tube also preferably has both a relatively high electrical resistance and a high thermal conductivity. The high electrical resistance maximizes the inductive coupling efficiency between the induction coil and the susceptor tube, which in turn maximizes the operating efficiency of the apparatus, and makes it possible to heat the tube to such a high temperature. The high thermal conductivity of the material also increases heat transfer efficiency between the tube and the material to be treated in the tube. With this arrangement, the material in the tube is heated both by conduction and radiant heating from the tube. In addition, an inert gas, such as nitrogen, is continually circulated through the tube to prevent combustion of the material, and the inert gas also acts as a means for heating the material by convection.

Preferably, the susceptor tube is formed from a nickel based super alloy, such as Haynes® 230™ Alloy or INCONEL alloy 600, both of which have a melting temperature in excess of 2300° F. These materials are particularly suited for use in the susceptor tube since they satisfy the three critical criteria which are high melting temperature, relatively high electrical resistance and relatively high thermal conductivity. These materials also have a relatively low mean coefficient of thermal expansion which is important from a structural standpoint considering the very high temperatures involved. If their thermal expansion coefficients were too high, the susceptor tube would expand too much during heating to be structurally manageable.

Depending upon the nature of the contaminated material to be treated, different arrangements are provided to feed or convey the material to and through the susceptor tube. With high moisture content soil having a pasty consistency, for example, a feed auger is employed to feed the material into the tube, and another auger is positioned within the tube to convey the material through the tube. In this embodiment, the auger also acts as a means for heating the material by conduction. If the contaminated material comprises solid, discrete objects, such as medical waste for example, the objects are loaded into boxes in a charging tube, and are then loaded into the susceptor tube by means of a plunger or ram.

In the susceptor tube, the temperature of the material being treated is elevated high enough to vaporize most contaminants, and thereby separate the contaminants from the material. Other, non-organic contaminants, such as heavy metals, remain with the material, but are rendered nonleachable since all moisture is driven off by the heating process. The necessary material temperature for complete desorption varies, depending upon the type and moisture content of the material, but is typically between 800° and 1200° F. At the exit end of the susceptor tube, the desorbed solids in the form of char are discharged before removal and disposal in any suitable manner (e.g., in a conventional landfill). The contaminated vapors are drawn off and fed through a series of condensing and scrubbing devices which condense the vapors for collection and subsequent recycling.

To control the temperature in the susceptor tube, a computer control circuit is provided which controls the amount of power supplied to the one or more induction coils by one or more corresponding power supplies. The computer control circuit receives as inputs for this purpose signals from a plurality of temperature monitoring devices positioned at a number of locations on the exterior of the susceptor tube, as well as in the char exit port and vapor line running from the exit end of the susceptor tube. In the auger embodiment, the computer control circuit also varies the speed of the auger drive motor to control the residence time of the material in the susceptor tube, and this provides another means by which the exit temperature of the treated material can be controlled.

BRIEF DESCRIPTION OF THE DRAWINGS

The foregoing and other features and advantages of the present invention will become apparent from the following detailed description of a number of preferred embodiments thereof, taken in conjunction with the accompanying drawings in which.

DETAILED DESCRIPTION OF THE PREFERRED EMBODIMENTS

Figure 1A:
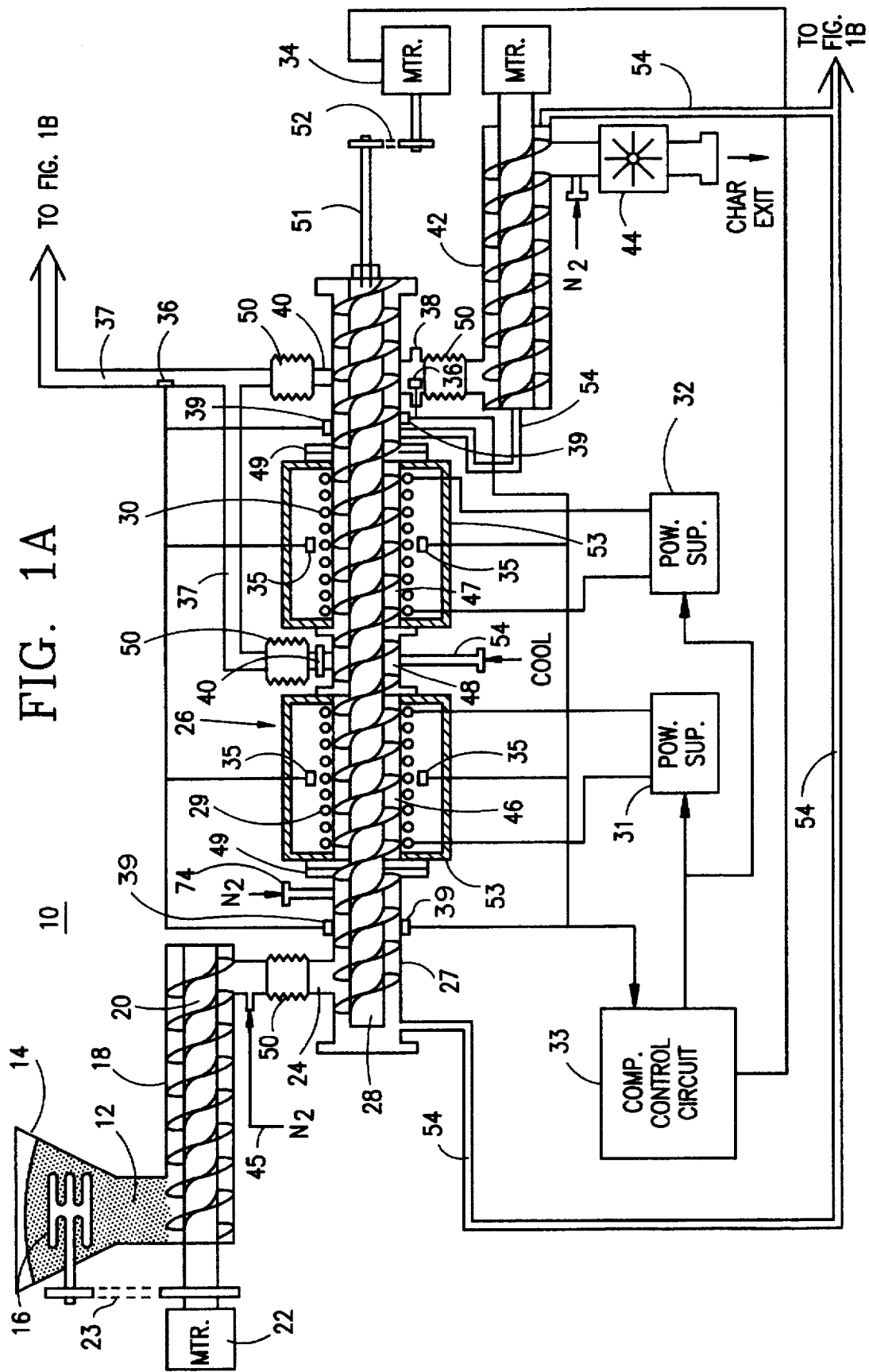
FIGS. 1A and 1B are first and second parts of a schematic diagram illustrating the overall system of a first preferred embodiment of the present invention for thermally desorbing contaminated material, with FIG. 1A illustrating the material feeding, heat treating and discharging section of the system, and FIG. 1B illustrating the exit gas treatment section of the system.
Figure 1B:
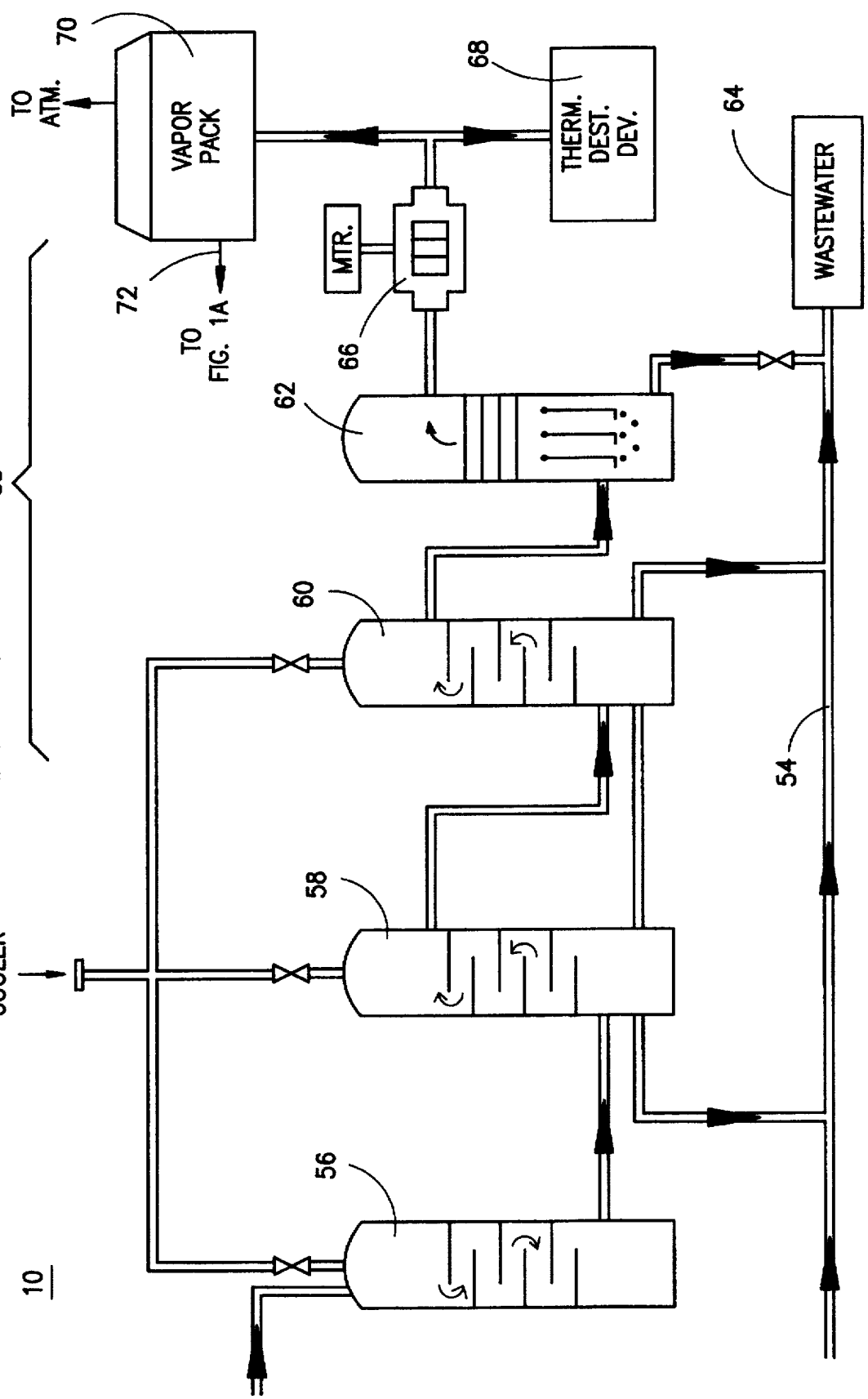

Turning now to a more detailed consideration of a first preferred embodiment of the present invention, FIGS. 1A and 1B illustrate a thermal desorption system 10 for removing contaminants from a particulate material 12, such as petroleum contaminated soil, for example. The material 12 is deposited in a feed hopper 14. The feed hopper 14 is of conventional construction, and preferably includes a rotating cake breaker 16 for breaking up the material 12. This is especially necessary when the material 12 has a high moisture content which tends to cause the material to have a pasty consistency, thus making it difficult to feed.

From the feed hopper 14, the material 12 drops into a feed tube 18 containing a feed auger 20 that is driven by a first motor 22. The auger 20 advances the material 12 to an inlet end 24 of an induction tube furnace (ITF) 26. A gear and chain drive mechanism 23 is connected between the shaft of the auger 20 and the shaft of the cake breaker 16 for driving the cake breaker 16.

The ITF 26 includes a generally cylindrical metal susceptor tube 27 in which is disposed, an auger 28 for advancing the solid material 12 therethrough. Both the susceptor tube 27 and the auger 28 are preferably formed from a high melting temperature metal or metal alloy. The metal or metal alloy which forms the susceptor tube 27 is particularly critical in that it must have a melting temperature well in excess of the ITF's preferred operating temperature of approximately 1800° F. to prevent it from becoming molten during operation of the ITF 26, and also must have both a high electrical resistivity and a high thermal conductivity. The high electrical resistivity is critical for efficient operation of the ITF 26 as discussed in greater detail below, although it cannot be so high as to render the susceptor tube 27 electrically insulating. Preferably, the melting temperature of the tube 27 should be greater than approximately 2300° F., while the resistance of the tube 27 should be greater than 100 μohm-cm at the tube's preferred operating temperature of 1800° F. The thermal conductivity of the susceptor tube 27 must be high enough to provide efficient heat transfer between it and the material 12 to be treated, and is preferably greater than or equal to approximately 195 BTU-in/ft$^2$-hr-°F. at the tube's preferred operating temperature of 1800° F. The susceptor tube material should also have a relatively low mean coefficient of thermal expansion which is necessary to prevent the tube from expanding so much during heating to its operating temperature that the expansion could not be accommodated by any mechanical supports which are employed to support the tube 27. Preferably, the mean coefficient of thermal expansion is below approximately 9.5 μin/in-°F. Finally, the annealing temperature of the susceptor tube material should be somewhat greater than its operating temperature, and is thus preferably greater than 1800° F.

In general, nickel based super alloys satisfy the foregoing criteria, and thus appear to be the materials most suited for use in the susceptor tube 27. It should be understood, however, that other metals or metal alloys could be employed as well, if one were willing to relax the resistivity and thermal conductivity parameter requirements to some extent, and sacrifice some operational efficiency. Two examples of these alloys are listed in Table I below along with their melting temperature, electrical resistivity, thermal conductivity, mean coefficient of thermal expansion and annealing temperature values.

TABLE I

| Susceptor Tube Mat. | Melt. Temp. (°F.) | Elec. Res. @1800° F. (μohm-cm) | Therm. Conduc. @1800° F. (BTU-in ft²-hr-°F.) | Mean Coef. of Therm. Exp. @1800° F. (μin/in-°F.) | Anneal. Temp. (°F.) |
|---|---|---|---|---|---|
| INCONEL alloy 600 | 2470–2575 | approx. 120 | 200 | 9.3 | approx. 1850° |
| Haynes® 230 ™ Alloy | 2375–2500 | approx. 125 | 195 | 8.9 | approx. 2250° |

Of the two alloys listed in Table I, it is apparent from the various parameters that Haynes® 230™ Alloy provides the most desirable characteristics for use in the susceptor tube 27. The typical chemical composition of the two alloys is provided in Table II below, although it will be understood that the compositions vary somewhat from batch to batch:

TABLE II

| Chemical Element | Wt. % for Haynes ® 230 ™ Alloy | Wt. % for INCONEL alloy 600 |
|---|---|---|
| Ni | 57% | 76.5% |
| Co | 5% | .05% |
| Fe | 3% | 6.86% |
| Cr | 22% | 15.8% |
| W | 14% | — |
| Mo | 2% | .01% |
| Mn | 0.5% | 0.20% |
| Si | 0.4% | 0.09% |
| Al | 0.3 | 0.046% |
| C | 0.10% | 0.042% |
| La | 0.02% | — |
| B | 0.015% | — |
| P | — | .011% |
| S | — | .001% |
| Cu | — | .02% |
| Ti | — | .32% |
| N | — | .012% |
| Cb | — | .02% |

Returning again to FIG. 1A, first and second spaced induction coils 29 and 30 surround the susceptor tube 27 which, when energized by first and second corresponding power supplies 31 and 32, respectively, inductively heat the tube 27. The resulting magnetic coupling between the induction coils 29 and 30 and the susceptor tube 27 is very efficient due to the relatively high electrical resistivity of the tube 27. As a result, with each of the coils 29 and 30 being approximately 4 feet in length, a susceptor tube exterior surface temperature of 1800° F. can be maintained at a material throughput rate of approximately 3000 lbs./hr. with a combined energy input level of approximately 400 kW from the power supplies 31 and 32.

The outputs of the power supplies 31 and 32 are controlled in response to signals received from a computer control circuit 33. The computer control circuit 33 also controls a variable speed motor 34 which drives the auger 28. The speed of the motor 34 determines the residence time of the material within the induction tube furnace 26, and, in combination with the output energy level of the power supplies 31 and 32, determines the temperature to which the material in the susceptor tube 27 is elevated.

To monitor the temperature of the susceptor tube 27, a plurality of infrared type thermal sensors 35 are positioned at top and bottom locations in the center of each of the coils 29 and 30. The sensors 35 detect infrared radiation from the tube 27 which is proportional to the tube's temperature. First and second conventional thermocouples 36 are positioned in an exit vapor line 37 and a char discharge port 38 which are employed to monitor the temperature of the vapor and char exiting the susceptor tube 27. Another plurality of conventional thermocouples 39 are positioned in contact with the susceptor tube 27 at both of its ends. The signals generated by the infrared temperature sensors 35 and the thermocouples 36 and 39 are fed into the computer control circuit 33, and are employed by the circuit to adjust the output levels of the power supplies 31 and 32, and the speed of the motor 34 as necessary to maintain the desired temperature within the susceptor tube 27.

During operation, the ITF 26 elevates the material's temperature to whatever temperature is sufficient to completely vaporize all moisture in the material 12, thereby desorbing it. For most materials, this temperature is typically between 800° and 1200° F. Since most contaminants within the material can be vaporized, this process effectively separates the contaminants from the solids in the material 12. Other, inorganic contaminants, such as heavy metals for example, remain in the material 12 but are nevertheless desorbed by the heating process, thus rendering them nonleachable, and acceptable under BDAT standards for disposal in a conventional landfill. In the preferred embodiments of the invention, the operating temperature of the susceptor tube 27 necessary to attain these material temperatures, is typically on the order of approximately 1800° F., although temperatures as low as 1200° F. may be sufficient, depending upon the material to be treated, and residence time in the tube 27.

Typical residence times in the susceptor tube 27 which are required to completely desorb the material 12 range from approximately 6 to 12 minutes, depending on the material's moisture content. During prototype testing, it has been discovered that the ITF 26 can be employed to completely desorb materials having moisture contents as high as 45%. A high throughput rate (e.g., 6000 lbs./hr.) can thus be achieved by the ITF 26 without excessive energy requirements. Again, this is due to the fact that both the electrical resistance and thermal conductivity of the susceptor tube 27 are relatively high, thereby providing efficient coupling of energy first from the coils 29 and 30 to the susceptor tube 27, and then from the susceptor tube 27 to the material to be treated. As a result, the material to be treated is quickly heated to the temperature necessary for complete desorption thereof as it is conveyed through the susceptor tube 27.

As the material 12 is heated in the ITF 26, the vaporized contaminants are drawn off through first and second vapor ports 40 disposed in the middle and at the exit end of the ITF 26 into the vapor line 37 for further treatment as illustrated in FIG. 1B, and discussed in greater detail below. The desorbed solids are discharged by gravity through the char discharge port 38 into a discharge and dust control conveyor 42. From the discharge and dust control conveyor 42, the processed solids exit the system 10 through a rotary valve 44 for collection and subsequent disposal by conventional means.

To insure that the material 12 does not undergo combustion in the ITF 26 during the thermal desorption process, the interior's of the feed tube 18, susceptor tube 27 and discharge conveyor 42 are sealed from the external atmosphere, and an inert, substantially oxygen-free atmosphere is continuously maintained within the susceptor tube 27 and the discharge and dust control conveyor 42. This is achieved by continuously pumping an inert gas, such as nitrogen, through a plurality of gas lines 45 that are connected to the exit end of the feed tube 18, the ITF 26 and the discharge end of the discharge and dust control conveyor 42. In addition, as long as the particulate material 12 in the feed hopper 14 is kept to a depth of approximately 1 foot or more, the external atmosphere is prevented from entering the feed tube 18.

Returning again to the susceptor tube 27, it is preferably divided into two separate sections 46 and 47 which are separated by a short intermediate section 48. This arrangement prevents thermal expansion forces during heating of the susceptor tube from becoming excessive. The various sections of the susceptor tube 27 are connected at a plurality of corresponding flanges 49.

A plurality of metallic bellows type expansion joints 50 are positioned adjacent to the input port 24 and the three exit ports 38 and 40, also to accommodate the thermal expansion of the susceptor tube 27 when it is heated to its very high operating temperature. A drive shaft 51 and gear and chain drive mechanism 52 connects the motor 34 to the auger 28, and these two elements provide another means by which thermal expansion of the susceptor tube 27 and auger 28 can be accommodated. A pair of aluminum covers 53 surround the induction coils 29 and 30. To provide cooling for the various system elements, cooling water is continuously circulated through a plurality of cooling water pipes 54 that are connected to the various system elements, including the ITF 26, the discharge of dust control conveyor 42 and the various elements illustrated in FIG. 1B to be discussed next.

Turning now to FIG. 1B, a vapor condensing and scrubbing system 55 is illustrated. The contaminant laden vapor exiting the ITF 26 is first fed into a pre-cooler 56 which employs a water spray to knock hydrocarbons out of the vapor stream, and quench the vapor. The pre-cooled gas is then directed through first and second series connected water scrubbers 58 and 60 (any number can be employed as necessary), and then through a demister 62, all of which act to further remove condensible liquids from the gas stream, and direct them to a waste water tank 64 for recovery and recycling. A motor driven blower 66 then exhausts the gas from the demister 62 to either a thermal destruction device 68 or an activated carbon vapor pack 70 for final filtration. The condensing and scrubbing system 55 is completely sealed, and the nitrogen rich waste gas is recycled through a line 72 exiting the vapor pack 70 back to a small inlet port 74 near the inlet end 24 to the ITF 26 (see FIG. 1A). The vapor pack 70 also contains a pressure relief valve (not shown) which vents excess pressure to the atmosphere.

Figure 2:
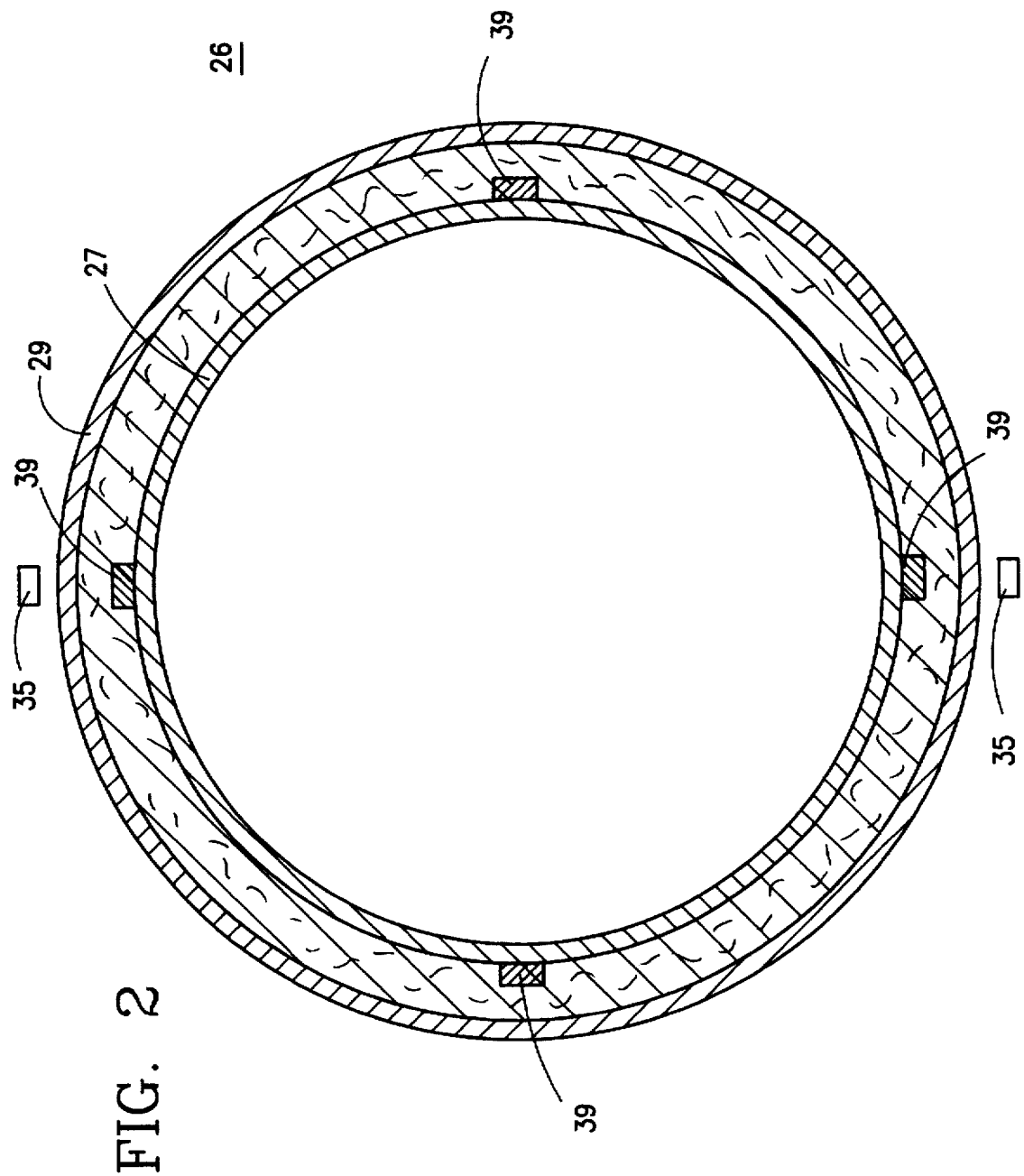
FIG. 2 is a cross sectional end view of an induction tube furnace employed with the first preferred embodiment of the present invention.

Turning now to FIG. 2, a cross sectional illustration of the susceptor tube 27 is shown with the first induction coil 29 surrounding it. The first coil 29 is preferably spaced from the exterior surface of the susceptor tube 27 by a distance of approximately 2.5 inches with an insulation filler 80 such as ceramic or blanket alumina, for example. Four of the thermocouples 39 are shown positioned in contact with the susceptor tube 27 at the 12, 3, 6 and 9 o'clock positions. The infrared temperature sensors 35 are spaced above and below the susceptor tube 27 by any suitable mounting arrangement (not shown), and are aimed at the surface of the susceptor tube 27 through openings (also not shown) formed in both of the coils 29 and 30.

Figure 3:
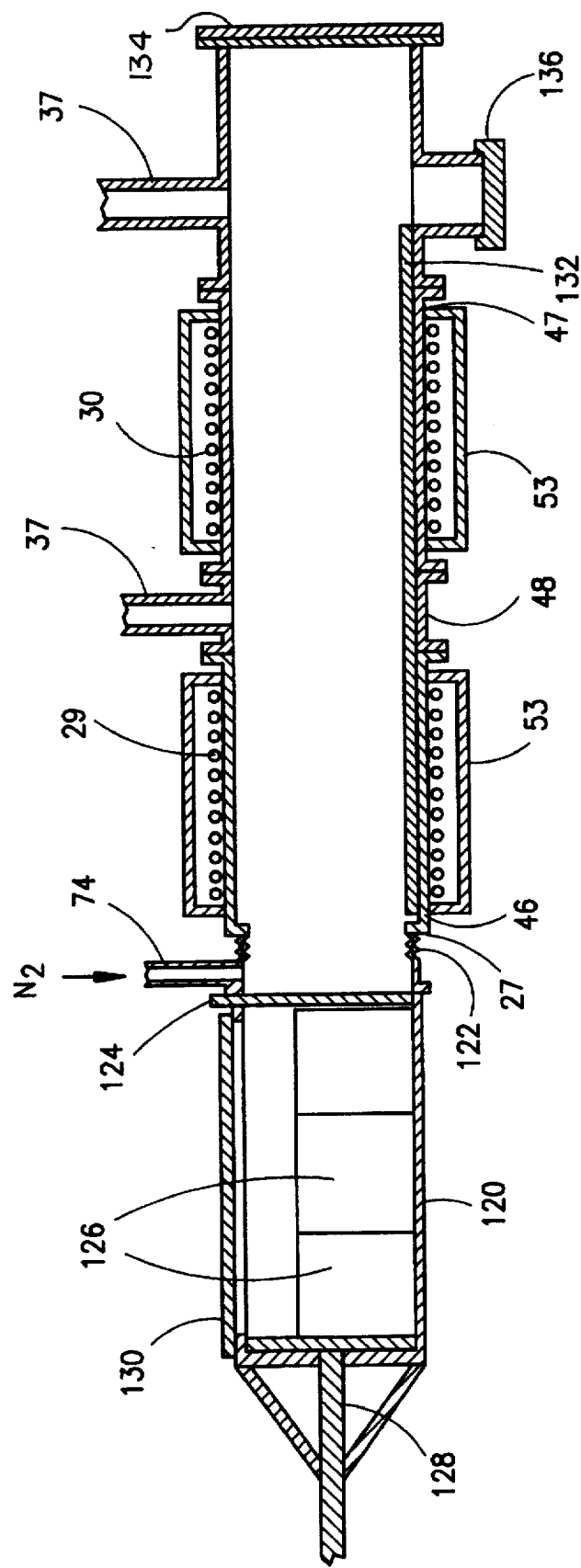
FIG. 3 is a cross sectional side view of an induction tube furnace employed with a second preferred embodiment of the present invention.

Referencing FIG. 3, a modification of the ITF 26 is illustrated which is employed with a second preferred embodiment of the present invention that is particularly useful for desorbing discrete objects, such as medical waste. This variation does not employ the feed hopper 14 or any of the augers 20, 28 or 48. Instead, a charging tube 120 is attached through an expansion joint 122 to the inlet end of the induction tube furnace 26. A moveable slide gate 124 selectively communicates the interior of the charging tube 120 with the interior of the susceptor tube 27.

A plurality of boxes 126 containing the discrete objects to be treated are positioned adjacent one another in the charging tube 120, and a pneumatically operated charging plunger 128 is employed to slide the boxes 126 into the susceptor tube 27. A hatch or door 130 is provided for loading the boxes 126 into the charging tube 120. After the boxes 126 are loaded into the susceptor tube 27, the slide gate 124 is closed, and the interior of the susceptor tube 27 is purged with nitrogen as in the first preferred embodiment. A removable tray 132 is positioned within the susceptor tube 27 for receiving the boxes 126. A rear access door 134 is positioned on the exit end of the ITF 26 which allows access to the interior of the susceptor tube 27 for periodic removal, cleaning and replacement of the tray 132. A slide gate 136 selectively covers the char discharge port 38 which is opened by any suitable means (not shown) after the desorption process is complete, so that the char can be removed from the susceptor tube 27.

In summary, the present invention provides an improved system for thermally desorbing contaminated materials which enables the material to be heated to a very high temperature sufficient for vaporizing most any volatiles that may be present in the material. The key to the successful operation of the system is the use of the induction tube furnace with the susceptor tube made from a high melting temperature, high electrical resistance and high thermal conductivity metal or metal alloy that permits raising the temperature of the material to be treated over 800° F. in a very efficient manner.

Although the invention has been disclosed in terms of a number of preferred embodiments, it will be understood that further modifications and variations could be made thereto without departing from the scope of the invention as defined in the following claims. For example, the size of the ITF 26 can be varied as desired, depending upon the nature and amount of material to be treated. As an example, the prototype version of the system illustrated in FIGS. 1A and 1B was made completely portable by mounting the system on a conventional 45 foot semitrailer.

What is claimed is:

1. A thermal desorption system for decontaminating materials comprising:
    an induction tube furnace for heating contaminated materials to be decontaminated, said induction tube furnace including:

a metal susceptor tube for receiving materials to be heated, said susceptor tube being formed from a metal having a melting temperature higher than approximately 2300° F., and an electrical resistance of greater than approximately 100 μohm-cm at 1800° F.; and at least one induction coil surrounding said susceptor tube for heating said tube to a temperature sufficient to completely desorb material contained in said susceptor tube;

means for charging material to be decontaminated into said susceptor tube;

at least one power supply for supplying current to said at least one induction coil to heat said susceptor tube;

means for maintaining an inert atmosphere in said susceptor tube during heating of said material therein;

means for removing from said susceptor tube, vaporized contaminants that are released from the material when it is heated; and means for removing desorbed material from said susceptor tube after it has been heated therein.

2. The system of claim 1, wherein said metal susceptor tube is formed from a metal having a thermal conductivity of greater than or equal to approximately 195 BTU-in/ft$^2$-hr-°F. at 1800 ° F.

3. The system of claim 2, wherein said metal susceptor tube is formed from a metal having a mean coefficient of thermal expansion of less than approximately 9.5 μin/in-°F. at 1800° F.

4. The system of claim 3, wherein said metal susceptor tube is formed from a nickel based alloy.

5. The system of claim 4, wherein said metal susceptor tube is formed from material consisting of one of the two following compositions:

| Chemical Element | Weight Percentage |
|---|---|
| Composition 1 | |
| Ni | 57 |
| Co | 5 |
| Fe | 3 |
| Cr | 22 |
| W | 14 |
| Mo | 2 |
| Mn | 0.5 |
| Si | 0.4 |
| Al | 0.3 |
| C | 0.10 |
| La | 0.02 |
| B | 0.015 |
| Composition 2 | |
| Ni | 76.5 |
| Co | 0.05 |
| Fe | 6.86 |
| Cr | 15.8 |
| Mo | 0.01 |
| Mn | 0.20 |
| Si | 0.09 |
| Al | 0.046 |
| C | 0.042 |
| P | 0.011 |
| S | 0.001 |
| Cu | 0.02 |
| Ti | 0.32 |
| N | 0.012 |
| Cb | 0.02 |

[Haynes ® 230 ™ Alloy].

6. The system of claim 1, wherein said metal susceptor tube is formed from a nickel based alloy.

7. The system of claim 6, wherein said metal susceptor tube is formed from material consisting of one of the two following compositions:

| Chemical Element | Weight Percentage |
|---|---|
| Composition 1 | |
| Ni | 57 |
| Co | 5 |
| Fe | 3 |
| Cr | 22 |
| W | 14 |
| Mo | 2 |
| Mn | 0.5 |
| Si | 0.4 |
| Al | 0.3 |
| C | 0.10 |
| La | 0.02 |
| B | 0.015 |
| Composition 2 | |
| Ni | 76.5 |
| Co | 0.05 |
| Fe | 6.86 |
| Cr | 15.8 |
| Mo | 0.01 |
| Mn | 0.20 |
| Si | 0.09 |
| Al | 0.046 |
| C | 0.042 |
| P | 0.011 |
| S | 0.001 |
| Cu | 0.02 |
| Ti | 0.32 |
| N | 0.012 |
| Cb | 0.02 |

[Haynes ® 230 ™ Alloy].

8. The system of claim 1, further comprising:

a conveyor disposed in said susceptor tube for conveying material to be heated therein through said susceptor tube;

a variable speed motor for driving said conveyor;

a plurality of temperature sensing devices for sensing the temperature of said susceptor tube and of material and contaminated vapors exiting said susceptor tube; and means responsive to signals generated by said temperature sensing devices for controlling said variable speed motor to control the residence time, and thereby exit temperature, of material being conveyed through said susceptor tube.

9. The system of claim 1, further comprising:

a plurality of temperature sensing devices for sensing the temperature of said susceptor tube and of material and contaminated vapors exiting said susceptor tube; and means responsive to signals generated by said temperature sensing devices for controlling the amount of current supplied by said at least one power supply to said at least one induction coil to thereby control the temperature to which said susceptor tube, and thereby material contained in said susceptor tube, is heated by said induction coil.

10. The system of claim 9, further comprising:

a conveyor disposed in said susceptor tube for conveying material to be heated therein through said susceptor tube; and a variable speed motor for driving said conveyor, said variable speed motor being controlled by said means responsive to signals generated by said temperature sensing devices to control the residence time, and thereby further control the exit temperature of material being conveyed through said susceptor tube.

11. The system of claim 1, further comprising:

a second induction coil surrounding said susceptor tube for heating said tube to a temperature sufficient to completely desorb material contained in said susceptor tube; and a second power supply for supplying current to said second induction coil to heat said susceptor tube.

12. The system of claim 1, wherein said means for charging material to be decontaminated into said susceptor tube comprises:

a material charging tube attached to an entrance end of said susceptor tube; and a charging ram disposed in said charging tube for pushing material contained in said charging tube into said susceptor tube.

13. The system of claim 1, further comprising:

means for treating removed vaporized contaminants from said susceptor tube to remove condensible liquids therefrom.

14. A method for thermal desorption of contaminated materials comprising the steps of:

providing a metal susceptor tube having a melting temperature higher than approximately 2300° F., and an electrical resistance of greater than approximately 100 μohm-cm at 1800° F.;

charging contaminated material to be treated into said metal susceptor tube;

supplying current to an induction coil surrounding said susceptor tube for heating said tube to a temperature sufficient to completely desorb the material contained therein;

maintaining an inert atmosphere in said susceptor tube during heating of said material therein;

removing from said susceptor tube, vaporized contaminants that are released from the material when it is heated; and removing desorbed material from said susceptor tube after it has been heated therein.

15. The method of claim 14, wherein said step of providing said metal susceptor tube further comprises providing a metal susceptor tube formed from a metal having a thermal conductivity of greater than or equal to approximately 195 BTU-in/ft$^2$-hr-°F. at 1800° F.

16. The method of claim 15, wherein said step of providing said metal susceptor tube further comprises providing a metal susceptor tube formed from a nickel based alloy.

17. The method of claim 14, further comprising the steps of:

sensing the temperature of said susceptor tube at one or more locations thereon;

sensing the temperature of a vapor stream exiting said susceptor tube;

sensing the temperature of desorbed material exiting said susceptor tube; and controlling the amount of current supplied to said induction coil in response to said sensed temperatures.

18. The method of claim 17, further comprising the steps of:

providing a conveyor in said susceptor tube for conveying material to be heated therein through said susceptor tube;

providing a variable speed motor for driving said conveyor; and controlling the speed of said variable speed motor in response to said sensed temperatures to control the residence time, and thereby exit temperature, of material being conveyed through said susceptor tube.

19. The method of claim 18, wherein said step of heating said susceptor tube further comprises heating said susceptor tube to a temperature of approximately 1800° F.

20. The method of claim 14, wherein said step of heating said susceptor tube further comprises heating said susceptor tube to a temperature sufficient to heat material contained in susceptor tube to approximately 800°–1200° F.

\* \* \* \* \*